Aug. 24, 1948.                    M. TORIE                    2,447,826
                                POULTRY NEST
Filed Aug. 2, 1946                                        2 Sheets-Sheet 1
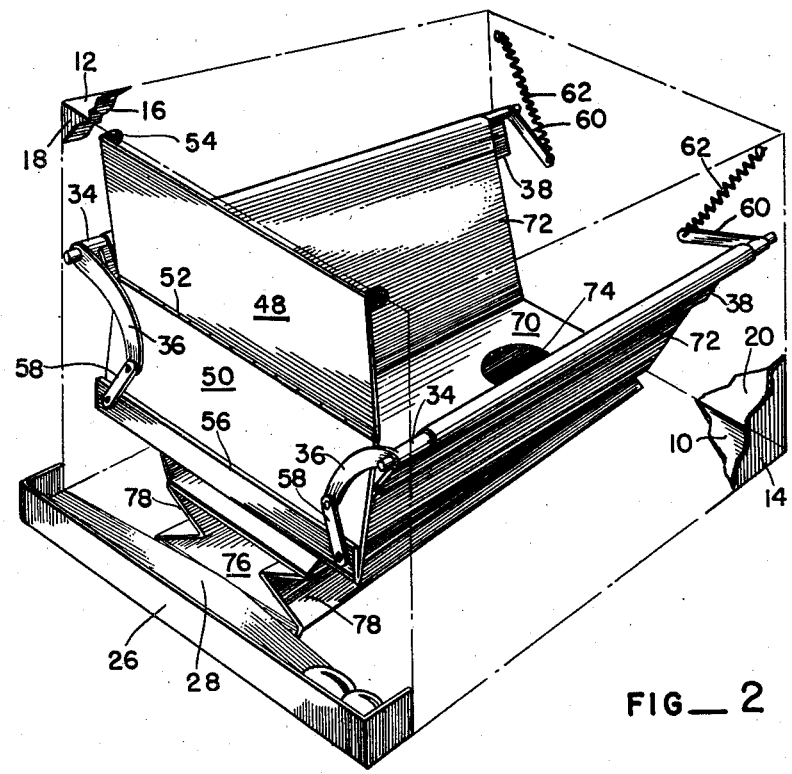
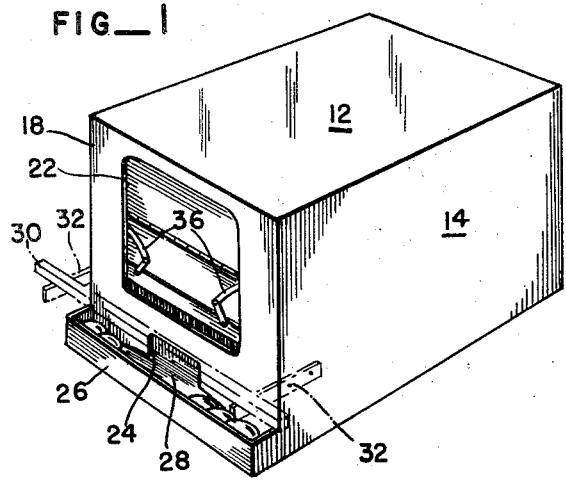
MAGNUS TORIE
*INVENTOR.*
BY *Smith & Tuck*
ATTORNEYS Aug. 24, 1948.    M. TORIE    2,447,826
POULTRY NEST
Filed Aug. 2, 1946    2 Sheets-Sheet 2
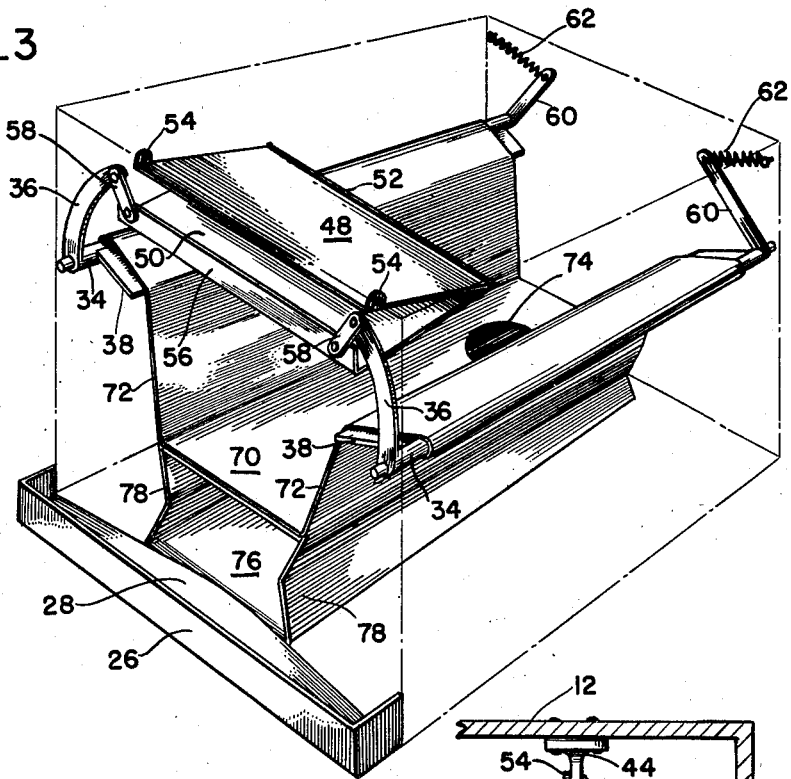
FIG_3
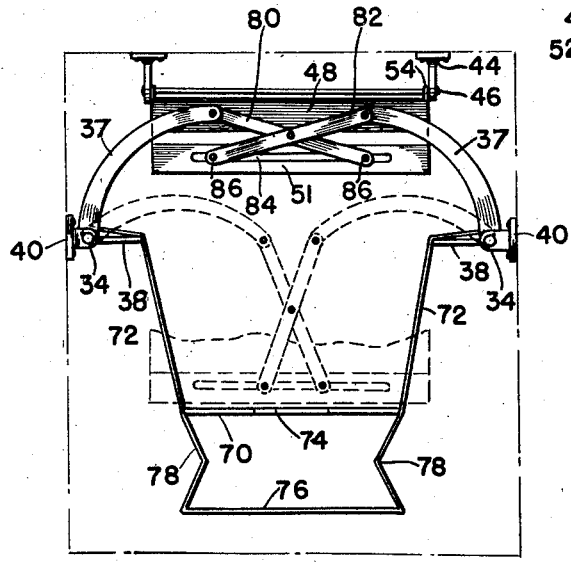
FIG_5
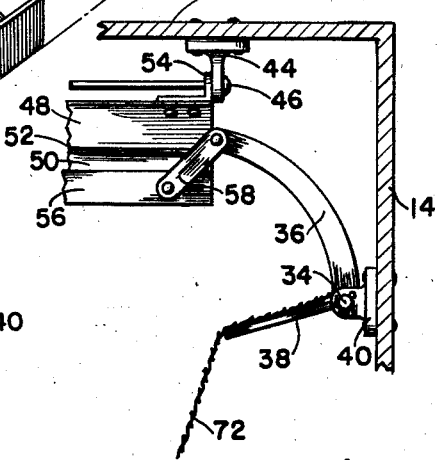
FIG_4
MAGNUS TORIE
*INVENTOR.*
BY *Smitt & Tuck*
ATTORNEYS Patented Aug. 24, 1948

2,447,826

UNITED STATES PATENT OFFICE 2,447,826

POULTRY NEST

Magnus Torie, Seattle, Wash.

Application August 2, 1946, Serial No. 688,113

12 Claims. (Cl. 119—47)

This invention relates to a poultry nest and, more particularly, to a device operated by a hen during her actions preparatory to and following the normal egg-laying process, which device is also capable of trapping the hen should she tend to "set" in the nest without laying.

Thus, the principal object of the invention is the provision of a poultry nest which will accommodate, without interference, a normally functioning laying hen, but which will also function to entrap a hen that tends to "set" in the nest without laying.

A further object of the invention resides in providing a poultry nest that functions as described through forces provided by a laying or setting hen without the instrumentality of external means or mechanisms.

Another object of my invention is the provision of simple and easily constructed and operated closure means for a poultry nest which will remain operable over long periods of time without attention from a poultryman and which is not subject to disarrangement or becoming inoperable through the normal actions of hens during use.

A still further object of the invention is the provision of elements that receive and direct an egg from where it is laid within the nest to a point where it may easily be taken by the poultryman during collection, and in so doing to quickly remove the same from the presence of the hen to maintain it clean and undamaged, and to reduce or eliminate subsequent processing for the market.

Still another object of the invention is to provide a poultry nest in which a hen may lay without interference from other hens seeking to enter the nest.

One other object is to provide a trapping device for hens during periods of setting, which device is easily adjusted and simply operated by the weight of the hen as long as she continues to "set" but which is automatically and rapidly released and made ready for the next hen upon rising action of the hen that has laid an egg.

The foregoing objects, and others ancillary thereto I prefer to accomplish as follows:

According to a preferred embodiment of my invention, I provide walls arranged together to form a poultry nesting enclosure for a laying chamber, and through one of which walls, by means of an opening, a hen may enter and leave before and after laying. Means is incorporated in the enclosure for closing said opening during laying and setting of a hen and such means is arranged to function by a simple bell-crank mechanism operated to open and to close by the actions of a hen in preparation for laying and following laying. The bell-crank mechanism is mounted within the enclosure along the sides thereof in such a position that as a hen squats to lay or set she effects the functioning of the closure means to draw the same downward across the access opening. A sub-chamber is provided below the main laying or setting chamber, and is provided with an opening from the latter chamber to permit the passage of an egg from above to the chamber below. Preferably, the chamber below has an inclined bottom to urge eggs deposited therein to a point of collection.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is an external perspective view of my poultry nest;

Fig. 2 and Fig. 3 are schematic perspective views of the enclosed working mechanism and closure means operated thereby employed to close an access opening of the nest of Fig. 1;

Fig. 4 is an enlarged fragmentary sectional view of an upper corner portion of the poultry nest; and Fig. 5 is an end view of alternative operating mechanism for the nest closure with the walls of the nest suggested by dashed lines.

Referring to the drawings, it will be seen that I form an enclosure by joining together a plurality of walls which provide a nesting chamber. Such enclosure comprises a bottom wall 10 and an upper top wall 12, between which are the side walls 14 and 16, the front wall 18, and the rear wall 20. In the front wall 18 is the upper opening 22 and the lower opening 24. Across the lower front of the enclosure is a collector trough 26 having bottom 28 sloping oppositely from the mid-point so that eggs which pass through opening 24 will tend to gravitate to either end of the trough 26. A rail or bar 30 is supported by arms 32 across the front of the enclosure, preferably adjacent the lower edge of opening 22.

In the preferred form of the invention shown in Figs. 1 through 4, I pivotally mount in each side of the enclosure, adjacent the sides of opening 22, a closure operating mechanism. Such mechanism comprises a bell-crank arrangement mounted to swing or revolve about the axis of the crank pin 34. Each bell-crank pin 34 has a first arm 36, and a second arm 38, which latter constitute in effect a ledge running substantially the full length of the enclosure on each side of the median thereof. As can be seen in Fig. 4 the crank pin 34 is pivotally mounted in a pair of bearings 40 that may be secured to the inner face of the side wall 14.

By means of a depending bearing element 44, supported from the roof or top wall 12, and carrying pin 46, I pivotally mount the closure element comprising panels 48 and 50, that are hinged together at 52. Panel 48 has pivot ears 54 mounted on pivot pins 46. A flange 56 is hingedly coupled to the lower edge of panel 50. A link 58 is pivoted to flange 56, one at each end, and each is pivotably coupled to a first crank arm 36. Flange 56 normally travels in an upright plane and the hinged coupling to panel 50 permits the latter to move from its open position in Fig. 2 to the closed position of Fig. 3.

For the purpose of biasing the hinged-together panels 48 and 50 to the retracted position, each of the crank pins 34 has an arm 60 between which and an inner wall of the enclosure is positioned the spring 62. It will be quite apparent that other modes of biasing the closure to the retracted position can be employed.

When a hen enters the enclosure through the opening 22, she normally stands upright. As she responds to the urge to lay an egg, she squats, or tends to squat, to the setting position, whereupon her body weight, which has previously been supported by her legs, is transferred to the ledges 38 of the bell-cranks and such ledges are depressed downward; thereupon, arms 36 swing downward and exert a downward force upon the lower panel 50 of the extensible closure, thus opening the same from the normal jack-knife position and disposing it across the inner face of the opening 22. Of course the springs 62 will be extended and tend to bias the closure to the upper retracted position as shown in Fig. 3.

When the hen has laid an egg, the normal reaction is for her to stand up and, in so doing, she lifts her weight from the ledges 38, permitting the closure to retract automatically. The hen may then leave the enclosure through the opening 22. In the event that the hen, instead of laying, merely prefers to set in the nest, as occurs in certain seasons, her weight will remain on the ledges 38 and the closure will remain down across the opening 22, trapping her as long as she is setting.

For the purpose of simplifying the gathering of eggs, and to remove a laid egg from the immediate presence of the hen, I employ additional elements to those recited and described above. For example, I mount platform 70 somewhat above the bottom of the enclosure and suspend it in that position by wall webs 72 which are attached to the ledges 38. An opening 74 in the rear of platform 70 permits the downward passage of an egg to below the platform. Opening 74 is located so that upon the deposit, by the hen, of a freshly laid egg, the latter will gravitate through said opening. A forwardly inclined sub-platform 76 is positioned below platform 70 by walls 78. The general inclination of the sub-platform 76 is from the rear downward toward the opening 24. Thus, an egg which descends to the sub-platform 76 tends to gravitate forward through opening 24 and into the collector trough 26, where it will be conveniently located for gathering. Walls 78 are shown as collapsible to permit any downward movement of the platform 70 occasioned by the occupation of the nest by a hen, and by the downward swinging movement of the ledges 38 shown in Fig. 2.

In Fig. 5 a modified form of closure actuation means is illustrated. In this instance, I mount between the first arms 37 of the bell-crank and panel 51 of the closure, a pair of pivoted-together scissor arms 80 and 82. Arms 80 and 82 at their lower ends have sliding pivotal connections with panel 51 by means of slot 84 in which moves the connector pin 86 as the arms change from the solid line showing of Fig. 5 to the lower dotted line showing of the same view. The pin and slot arrangement in this instance comprises the lost-motion connection necessary between the first arm of the bell-crank and the closure due to the relative swinging and straight-line motion of the respective parts.

I have found that the wall 72 and the wall 78 may be made of fabric, such as muslin or canvas, but net or similar flexible and collapsible material is equally useful as long as it will accommodate the changes occasioned by the downward movement of the platform 70 and the downward swinging movement of the ledges 38.

While I have shown and described particular embodiments of my invention, it will occur to those skilled in the art that various changes and modifications may be made without departing from the invention, and I therefore aim in the appended claims to cover all such changes and modifications as fall within the true spirit and scope of my invention.

Having thus described my invention, I claim:

1. A poultry nest, comprising: means forming an enclosure having an opening, extensible closure means mounted above said opening to close the same, a bell-crank pivotally mounted in said enclosure on each side of said opening and including a first and a second arm, the first arm of each bell-crank being connected with the lower portion of said closure means to impart closing motion thereto, said second arm of each bell-crank comprising a ledge positioned to each side of the median of said enclosure and extending substantially throughout its length from the opening to the opposite end, and means normally biasing said closure means to the retracted position.

2. A poultry nest, comprising: means forming an enclosure having an opening, downward extensible folding-door closure means mounted above said opening to close the same, a bell-crank pivotally mouted in said enclosure on each side of said opening and including a first and a second arm, the first arm of each bell-crank having a link connection with the lower portion of said closure means to impart closing motion thereto, said second arm of each bell-crank comprising a ledge positioned to each side of the median of said enclosure and extending substantially throughout its length from the opening to the opposite end, and means normally biasing said folding-door closure means to the retracted position.

3. A poultry nest, comprising: means forming an enclosure having an opening, a first door panel pivotally mounted above said opening, a second door panel hinged to said first door panel, a bell-crank pivotally mounted in said enclosure on each side of said opening and including a first and a second arm, the first arm of each bell-crank being connected with a lower portion of the second door panel to impart closing motion thereto, said second arm of each bell-crank comprising a ledge positioned to each side of the median of said enclosure and extending substantially throughout its length from the opening to the opposite end, and means normally biasing said closure means to the retracted position.

4. A poultry nest, comprising: means forming an enclosure having an opening, extensible closure means mounted above said opening to close the same, a bell-crank pivotally mounted in said enclosure on each side of said opening and including a first and a second arm, the first arm of each bell-crank being connected with the lower portion of said closure means to impart closing motion thereto, said second arm of each bell-crank comprising a ledge positioned to each side of the median of said enclosure and extending substantially throughout its length from the opening to the opposite end, means normally biasing said closure means to the retracted position, and a platform suspended from said second arms and above said enclosure bottom.

5. A poultry nest, comprising: means forming an enclosure having an opening, extensible closure means mounted above said opening to close the same, a bell-crank pivotally mounted in said enclosure on each side of said opening and including a first and a second arm, the first arm of each bell-crank being connected with the lower portion of said closure means to impart closing motion thereto, said second arm of each bell-crank comprising a ledge positioned to each side of the median of said enclosure and extending substantially throughout its length from the opening to the opposite end, and a spring-drawn lever associated with said bell-crank to bias the same and said closure means to the retracted poposition.

6. A poultry nest, comprising: means forming an enclosure having an opening, extensible closure means mounted above said opening to close the same, a bell-crank pivotally mounted in said enclosure on each side of said opening and including a first and a second arm, the first arm of each bell-crank being connected with a lower portion of said closure means to impart closing motion thereto, a platform in said enclosure above the bottom thereof, a suspension member between said platform and the second arm of each of said bell-cranks, and means normally biasing said closure means to the retracted position.

7. A poultry nest, comprising: means forming an enclosure having an opening, extensible closure means mounted above said opening to close the same, a bell-crank pivotally mounted in said enclosure on each side of said opening and including a first and a second arm, the first arm of each bell-crank being connected with the lower portion of said closure means to impart closing motion thereto, a ported platform in said enclosure above the bottom thereof, a suspension member between said platform and the second arm of each of said bell-cranks, and means normally biasing said closure means to the retracted position.

8. A poultry nest, comprising: means forming an enclosure having an opening and a sloping bottom, extensible closure means mounted above said opening to close the same, a bell-crank pivotally mounted in said enclosure on each side of said opening and including a first and a second arm, the first arm of each bell-crank being connected with the lower portion of said closure means to impart closing motion thereto, a ported platform in said enclosure above the sloping bottom thereof, a suspension member between said platform and the second arm of each of said bell-cranks, means normally biasing said closure means to the retracted position, and an egg collector trough to receive eggs that roll down said sloping bottom.

9. A poultry nest, comprising: means forming an enclosure having an opening, extensible closure means mounted above said opening to close the same, a bell-crank pivotally mounted in said enclosure on each side of said opening and including a first and a second arm, the first arm of each bell-crank being connected with the lower portion of said closure means to impart closing motion thereto, a ported platform in said enclosure above the bottom thereof, a suspension member between said platform and the second arm of each of said bell-cranks, means normally biasing said closure means to the retracted position, and a sloping sub-platform suspended from said ported platform and including walls to define a sloping tunnel.

10. A poultry nest, comprising: means forming an enclosure having an opening, downward extensible folding door closure means mounted above said opening to close the same, a bell-crank pivotally mounted in said enclosure on each side of said opening and including a first and a second arm, the first arm of each bell-crank being connected with the lower portion of said closure means to impart closing motion thereto, a platform in said enclosure above the bottom thereof, a suspension member between said platform and the second arm of each of said bell-cranks, and means normally biasing said folding door closure means to the retracted position.

11. A poultry nest, comprising: means forming an enclosure having an opening, extensible closure means mounted above said opening to close the same and having a slot, a bell-crank pivotally mounted in said enclosure on each side of said opening and including a first and a second arm, a pair of pivoted-together scissors arms slidably associated with said slot, the first arm of each bell-crank having a connection with one of the arms of said scissors arms, said second arm of each bell-crank comprising a ledge positioned to each side of the median of said enclosure and extending substantially throughout its length from the opening to the opposite end, and means normally biasing said closure means to the retracted position.

12. A poultry nest, comprising: means forming an enclosure having an opening, extensible closure means mounted above said opening to close the same and having a slot, a bell-crank pivotally mounted in said enclosure on each side of said opening and including a first and a second arm, a pair of pivoted-together scissors arms slidably associated with said slot, the first arm of each bell-crank having a connection with one of the arms of said scissors arms, a platform in said enclosure above the bottom thereof, a suspension member between said platform and the second arm of each of said bell-cranks, and means normally biasing said closure means to the retracted position.

MAGNUS TORIE.